United States Patent [19]

Corzine

[11] Patent Number: 4,728,130
[45] Date of Patent: Mar. 1, 1988

[54] LOCKING ASSEMBLY FOR PUSH-ON FITTINGS

[76] Inventor: George S. Corzine, 2556 Barrett Ave., Naples, Fla. 33962

[21] Appl. No.: 60,233

[22] Filed: Jun. 10, 1987

Related U.S. Application Data

[63] Continuation-in-part of Ser. No. 2,437, Jan. 12, 1987, abandoned.

[51] Int. Cl.[4] .............................................. F16L 19/02
[52] U.S. Cl. .................................. 285/351; 285/353; 285/387; 285/318
[58] Field of Search ............... 285/387, 388, 353, 318, 285/351, 384

[56] References Cited

U.S. PATENT DOCUMENTS

| | | | |
|---|---|---|---|
| 2,366,341 | 1/1945 | Lappin | 285/387 X |
| 3,181,896 | 5/1965 | Russell | 285/387 X |
| 3,428,337 | 2/1969 | Read | 285/353 X |
| 3,488,073 | 1/1970 | Wold | 285/388 |
| 3,679,237 | 7/1972 | De Angelis | 285/387 X |
| 4,055,359 | 10/1977 | McWethy | 285/318 X |
| 4,150,845 | 4/1979 | Riuli et al. | 285/388 X |
| 4,343,496 | 8/1982 | Petranto | 285/387 X |
| 4,580,788 | 4/1986 | Rabe et al. | 285/353 X |

FOREIGN PATENT DOCUMENTS 777322 12/1980 U.S.S.R. .............................. 285/387

Primary Examiner—Thomas F. Callaghan
Attorney, Agent, or Firm—Merrill N. Johnson

[57] ABSTRACT

A locking assembly for securing the connection between a push-on fitting having a flared end fitted into a cage and surrounded by a garter-type coiled spring housed within the cage on a pipe having a plurality of O-rings sealing the connection between the push-on fitting and the pipe. The assembly comprises an axially split male fitting and an axially split locking nut. The two halves of the axially split male fitting are sized to snugly encircle the push-on fitting with the ends of the two halves of the male fitting resting against the flared end of the push-on fitting and thus forcing the coiled spring away from the push-on fitting. The two halves of the axially split locking nut snugly encircle the cage housing the coiled spring while an internal face of the two halves of the nut engage and securely lock the position of the two halves of the male fitting. The two halves of the locking nut are then securely joined together by a pair of screws threaded into aligned threaded holes in both halves of the locking nut.

9 Claims, 11 Drawing Figures

LOCKING ASSEMBLY FOR PUSH-ON FITTINGS

This application is a continuation-in-part of my earlier application Ser. No. 002,437 filed Jan. 12, 1987 and now abondoned.

BACKGROUND AND SUMMARY OF THE INVENTION

The invention lies in the field of fluid line couplings and particularly couplings using push-on fittings. My invention provides a unique locking assembly which insures the leak-proof sealing of couplings utilizing push-on fittings.

When the Ford Motor Company began using push-on fittings with garter-type coil springs on its vehicle air conditioning fluid lines and fuel lines, it created a vehicle service industry problem that until recently could be solved only by buying and installing new Ford-made components. The problem continues to be acute due to the high incidence of failure of the O-rings used to seal the connection between the push-on fitting and the pipe to which it is coupled.

The end of the push-on fitting is flared and sized to fit into a cage which houses a garter-type coiled spring. The fitting is pushed onto the pipe and over the O-rings on the end of the pipe until the flared end of the fitting enters the cage and forces the coil spring over the flared end of the pipe and down to encircle the fitting. The spring now prevents the fitting from being pulled out of the cage. Fluid under pressure is sealed within the line by the O-rings between the pipe and the push-on fitting.

Push-on fittings are used to connect a flexible hose to the condenser, the evaporator, the accumulator and the compressor of the air conditioning system and also for connections to the gasoline tank and the carburetor of the vehicle's fuel system.

The fluid lines of vehicle air conditioning systems conventionally operate with line pressures of at least 100 p.s.i. and, at high ambient temperatures, line pressures of 300 p.s.i. are not uncommon. These pressures put severe strain upon the seal between the push-on fitting and the pipe to which the fitting is coupled.

The high incidence of O-ring failures results from high line pressures and the fact that the push-on fitting is usually on one end of a length of flexible hose. Constant vibration and movement of the flexible hose during running of the vehicle's engine and the vehicle itself forces the fitting to move back and forth transverse to its axis, causing wear and eventual rupture of the seal between the O-rings and the inner surface of the push-on fitting.

My locking assembly holds the push-on fitting in axial alignment with the pipe to which the fitting is coupled and, in addition, puts a 360° inwardly directed pressure on the seal between the O-rings and the inner surface of the fitting.

The assembly includes two major components; namely, an externally threaded or flanged male fitting and a uniquely shaped locking nut. Both the male fitting and the locking nut are axially sawed apart into two mirror-image halves. The male fitting has a thin preferably beveled lip at its front end and its internal diameter equals the outside diameter of the push-on fitting. The locking nut is formed to fit over the cage on the pipe and includes internal threading or a recess which meshes with the external threading or engages with the flange of the male fitting. The two halves of the locking nut each contain two threaded holes running perpendicular to the axis of the nut which, when the halves are fitted together, accommodate two screws to securely join the halves into a locking nut.

My unique locking assembly is used in the following manner: The push-on fitting is coupled to the pipe in the usual way by pushing the flared end of the fitting over the end of the pipe and the O-rings encircling the end of the pipe until the flared end of the fitting enters the cage on the pipe containing the garter-type coil spring. Continued pushing on the fitting will cause the coil spring to expand, pass over the flared end of the fitting and then contract and encircle the fitting. The fitting now cannot be withdrawn from the cage. The fluid such as freon-based R-12 refriderant passing through the pipe and the flexible hose connected to the push-on fitting operating under pressures of 100 p.s.i. or more is sealed only by the O-rings on the end of the pipe.

In order to prevent engine vibration and vehicle movement from eventually rupturing these seals, the two halves of my male fitting are placed around the push-on fitting and the thin lip of the fitting pushed into the cage. The lip forces the coil spring away from the fitting until the forward edge of the male fitting presses against the flange of the push-on fitting. Then the two halves of my locking nut are placed over the cage of the pipe and the nut's threads or recess are engaged with the external threads or flange of the male fitting. Two screws are threaded into the two aligned holes in the locking nut to draw the two halves securely together.

DETAILED DESCRIPTION OF THE PREFERRED EMBODIMENT

Figure 1:
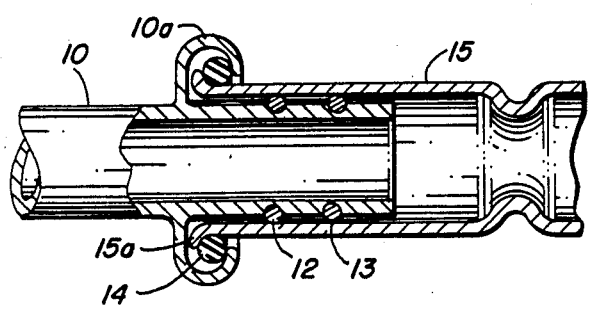
FIG. 1 is an elevational view partially in cross-section showing a conventional push-on fitting coupled to a caged garter-type coil spring mounted on an air conditioning condenser pipe.

Referring first to FIG. 1 of the drawings, there is shown a conventional "quick connect" push-on type fitting used by the Ford Motor Company on most of its vehicle refrigerant lines and also on some of its fuel lines. Condenser pipe 10 includes a cage 10a which houses a garter-type coil spring 14. A flexible hose (not shown) is connected to pipe 10 by push-on fitting 15 which has an outwardly flaring end 15a. In practice, fitting 15 is pushed onto the end of pipe 10 and over O-rings 12 and 13 which are fitted into semi-circular grooves in the end of pipe 10 as shown in FIG. 1. O-rings 12 and 13 are preferably made of synthetic rubber or similar resilient material.

As the flared end 15a of fitting 15 is pushed into cage 10a, spring 14 will be forced up and over the end of pipe 15. The spring now prevents the removal of fitting 15 from the cage without the use of a special tool. However, the fluid under pressure within the condenser and hose, which pressure is usually at least 100 p.s.i. and often much more, is sealed only by O-rings 12 and 13. Continual transverse movement of fitting 15 due to engine vibration and vehicle travel over rough roads and frequent temperature changes over several hundred degrees fahrenheit tend to cause frequent failure of O-ring seals 12 and 13.

Figure 2:
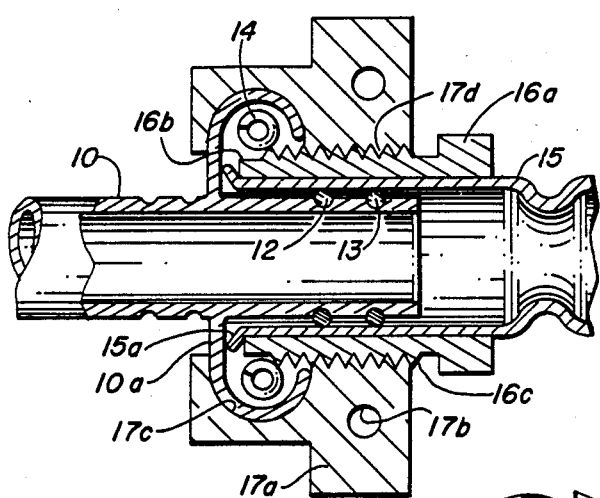
FIG. 2 is an elevational view largely in cross-section showing one preferred embodiment of my invention.
Figure 3:
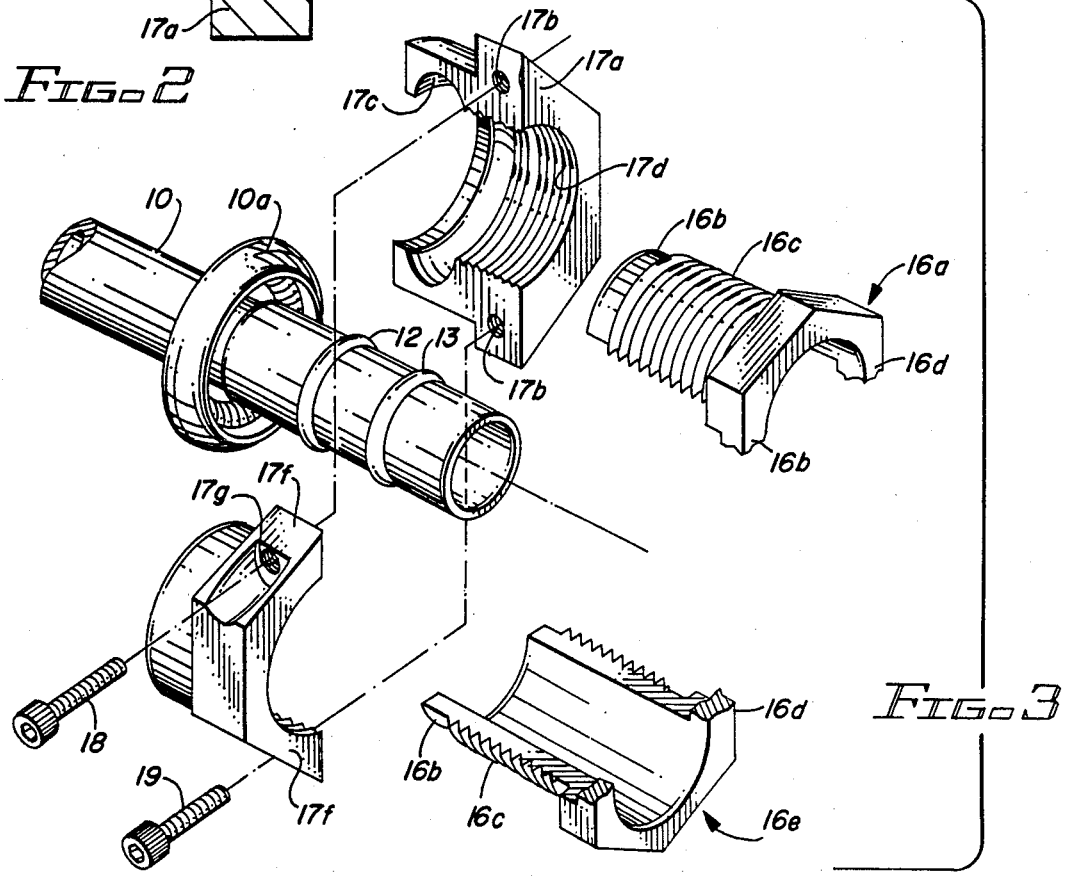
FIG. 3 is an exploded view of the major components of my invention as shown in FIG. 2.

FIGS. 2 through 5 illustrate one preferred embodiment of my unique locking assembly for preventing early failure of the seal provided by conventional push-on fitting connections such as shown in FIG. 1. FIG. 2 illustrates my locking assembly installed on the push-on fitting arrangement shown in FIG. 1. The components of the conventional fitting illustrated in FIG. 2 bear the same identifying numerals used in FIG. 1. FIG. 3 is an exploded view of the major components of my locking assembly; namely, externally threaded male fitting 16 and locking nut 17, both of which are axially sawed in half prior to use.

Figure 4:
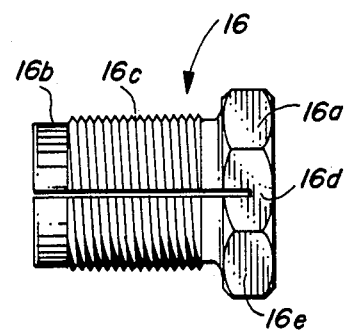
FIG. 4 is an elevational view of the joined-together halves of the externally threaded male fitting of my invention.
Figure 5:
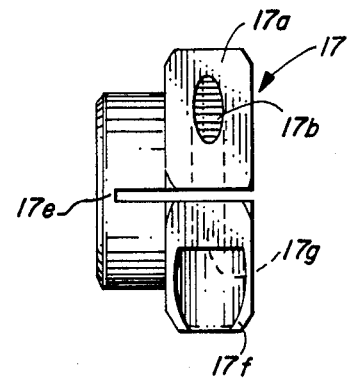
FIG. 5 is an elevational view of the joined-together halves of the locking nut of my invention.

Both male fitting 16 and locking nut 17 are manufactured as a single device and then almost sawed in half with only two small metal segments joining their two mirror-image halves together as shown by segment 16d in FIG. 4 and segment 17e in FIG. 5. Immediately prior to use, segments 16d and 17e are sawed or otherwise broken apart to separate the two halves 16a and 16e of fitting 16 and halves 17a and 17f of locking nut 17 as best shown in FIG. 3.

Fitting 16 has an externally threaded portion 16c, a thin unthreaded lip 16b and a hexagonal collar 16d at its opposite end. The internal diameter of fitting 16 is equal to the outer diameter of push-on fitting 15.

Locking nut 17 includes a semi-annular recess 17c shaped and sized to fit snugly over pipe cage 10a and also includes an interiorly threaded portion 17d sized to mesh with and fit into the externally threaded portion 16c of male fitting 16. In addition, locking nut 17 includes two threaded holes 17b and 17g which run through the nut at right angles to the axis of the nut. A pair of Allen head screws 18 and 19 are threaded into holes 17b and 17g to join nut halves 17a and 17f together.

To prevent engine vibration, vehicle movement and/or extreme variations in operating temperature from rupturing the seal between O-rings 12 and 13 and the inner surface of push-on fitting 15, my locking assembly is installed over pipe 10 and fitting 15 as best shown in FIGS. 2 and 3.

First male fitting halves 16a and 16e are fitted around push-on fitting 15 and lip 16b is pushed firmly into cage 10a forcing coil spring 14 outwardly away from fitting 15 until the end of lip 16b rests against the flanged end 15a of the push-on fitting which in turn rests against cage 10a.

Then the recess 17c of the two halves 17a and 17f of the locking nut is fitted over cage 10a and the nut's internal threads 17d are meshed with the external threads 16c of the male fitting. Screws 18 and 19 are then threaded into holes 17b and 17g to securely join the two nut halves together and fix the two halves of fitting 16 firmly in place, thus exerting a strong 360° inward pressure on push-on fitting 15.

If desired, male fitting 16 can be screwed somewhat further into cage 10a, thus forcing push-on fitting 15 to remain in strict axial alignment with pipe 10.

Figure 6:
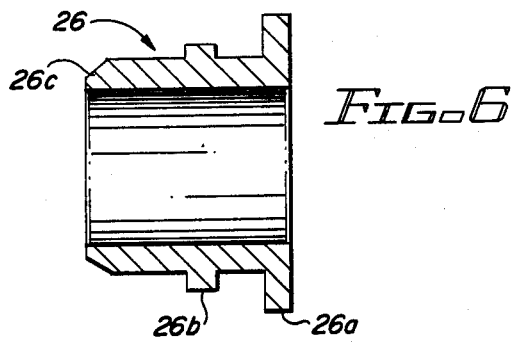
FIG. 6 is an elevational view showing one half of a second form of the male fitting of my invention.
Figure 7:
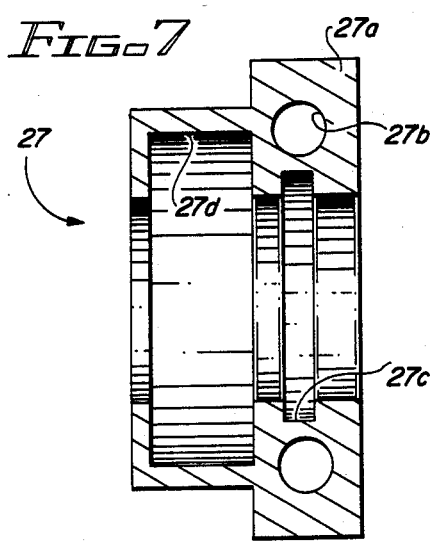
FIG. 7 is an elevational view showing one half of a second form of the locking nut of my invention.
Figure 8:
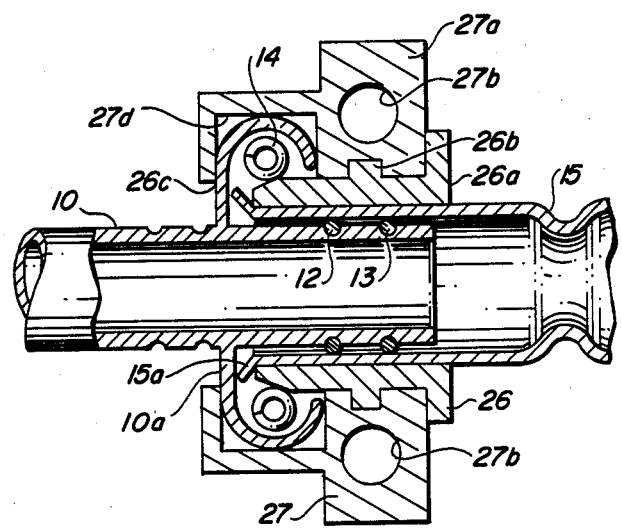
FIG. 8 is an elevational view largely in cross-section showing the fitting and nut shown in FIGS. 6 and 7 assembled on a conventional push-on fitting connection.

FIGS. 6 through 8 illustrate another embodiment of my locking assembly for push-on fitting connections as shown in FIG. 1. FIG. 6 shows one mirror-image half 26 of the male fitting and FIG. 7 shows one half 27 of the locking nut used in this embodiment.

Fitting half 26 includes a collar 26a, an annular flange 26b which is square in cross-section and a beveled front lip 26c. Locking nut half 27 includes a collar 27a, a pair of threaded holes 27b bored transversely to the axis of the nut half, an annular groove 27c sized to accomodate flange 26b, and an annular recess 27d designed to fit over the cage 10a which houses the garter spring of the push-on fitting.

FIG. 8 shows the beveled lip 26c of the fitting half pushed against the flared end of fitting 15 and forcing garter spring 14 away from fitting 15. Fitting 26 is maintained in this position by the engagement of the fitting's flange 26b in locking nut recess 27c. Locking nut 27 is maintained in its position by its engagement with cage 10a. By joining the two nut halves together by means of two screws (not shown) threaded into holes 27b, the push-on coupling is maintained firmly in axial alignment and a strong 360° inward pressure is exerted on push-on fitting 15.

Figure 9:
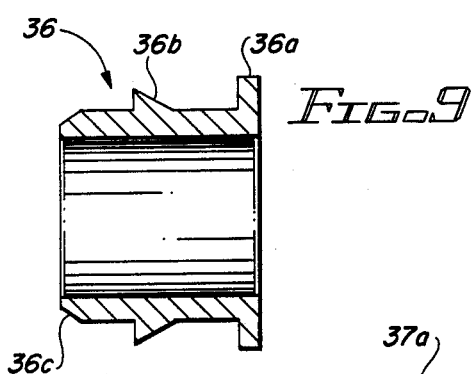
FIG. 9 is an elevational view of one half of a third form of fitting for use in my invention.
Figure 10:
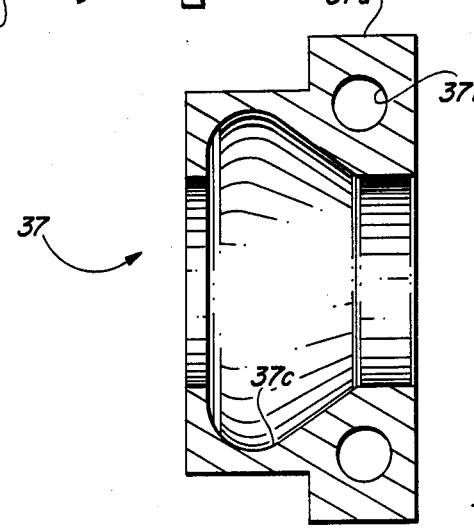
FIG. 10 is an elevational view of one half of a third form of locking nut for use in my invention.
Figure 11:
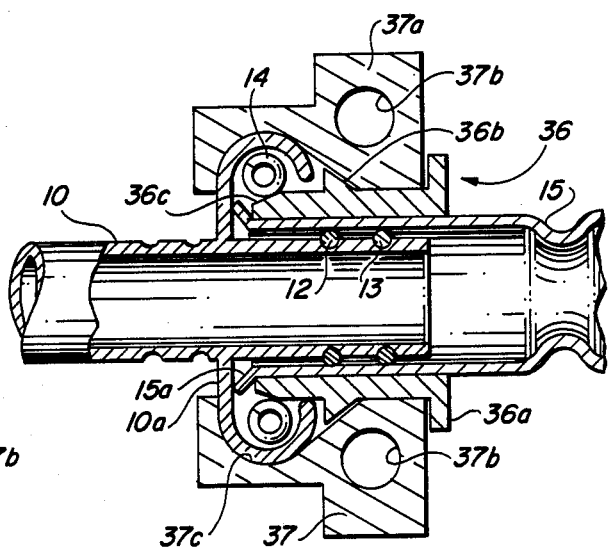
FIG. 11 is an elevational view largely in cross-section of the fitting and nut shown in FIGS. 9 and 10 assembled on a conventional push-on fitting connection.

FIGS. 9 through 11 illustrate a third embodiment of my locking assembly. FIG. 9 shows one half 36 of the male fitting and FIG. 10 shows one half 37 of the locking nut of this embodiment.

Fitting half 36 includes a collar 36a, an inclined annular flange 36b which is triangular in cross-section and a beveled front lip 36c. Locking nut half 37 includes a collar 37a, a pair of similar threaded holes 37b bored transversely to the axis of the nut half, and a unique generally annular recess 37c sized to engage both the inclined flange 36b of fitting half 36 and also the opposite surface of cage 10a as best shown in FIG. 11.

FIG. 11 shows the beveled lip 36c pushed against the flared end of fitting 15 thus forcing garter spring 14 upwardly away from fitting 15. In this embodiment fitting 36 is maintained in its position as shown by the locking nut's annular recess 37c engaging both the inclined flange 36b and the opposite surface of cage 10a. The two halves of the locking nut are joined together by two screws (not shown) threaded into the two holes 37b in the collar 37a of the nut halves.

While I have shown and described three embodiments of my locking assembly, various changes and modifications will be apparent to those skilled in the art without departing from the spirit of my invention. No limitation should be inferred from the foregoing description since the scope of the invention is defined only in the appended claims.

I claim:

1. A locking assembly for securing the connection between a push-on fitting having a flared end fitted into a cage and surrounded by a garter-type coil spring housed within the cage of a pipe with an O-ring sealing the connection between the push-on fitting and the pipe comprising an axially split externally flanged male fitting, the two halves of said split male fitting being sized to snugly encircle the push-on fitting with one end of each of the two halves resting against the flared end of the push-on fitting and forcing the coil spring away from the push-on fitting, and an axially split and recessed locking nut, the two halves of said nut formed to snugly encircle the cage housing the coil spring and also engage the flange of the two halves of the male fitting, the two halves of the locking nut being securely joined together by a pair of screws threaded into aligned holes in both halves of the locking nut, whereby inwardly directed pressure is applied to the outside surface of the push-on fitting to exert an inwardly directed pressure on the O-ring and the pipe.

2. A locking assembly as set forth in claim 1 wherein the flange on the male fitting consists of a segment of external threading running axially on the outside of the fitting halves and the locking nut halves are internally threaded so as to mesh with the external threads of the male fitting when the components are assembled.

3. A locking assembly as set forth in claim 1 wherein the flange on the male fitting consists of an annular ring square in cross-section on the outer surface of the fitting and the locking nut has an annular recess sized to engage and contain the annular flange of the male fitting when the components are assembled.

4. A locking assembly as set forth in claim 1 wherein the flange on the male fitting consists of an inclined annular ring triangular in cross-section and the locking nut contains an annular recess sized to engage and snugly rest against both the inclined face of the annular ring of the male fitting and the opposite surface of the cage of the push-on fitting.

5. A locking assembly as set forth in claim 2 wherein the male fitting is screwed into the cage forcing the push-on fitting to remain in strict axial alignment with the pipe.

6. A locking assembly for securing the connection between a push-on fitting having a flared end fitted into a cage and surrounded by a garter-type coil spring housed within the cage of a pipe with a resilient O-ring sealing the connection between the push-on fitting and the pipe comprising an axially split externally threaded male fitting, the two halves of said split male fitting being sized to snugly encircle the push-on fitting with one end of each of the two halves resting against the flared end of the push-on fitting and forcing the coil spring away from the push-on fitting, an axially split and internally threaded locking nut, the two halves of said nut formed to snugly encircle the cage housing the coil spring while the threads of the two halves of the nut engage and mesh with the threads of the two halves of the male fitting, and means for securely joining together the two halves of the locking nut, whereby inwardly directed pressure is applied to the outside surface of the push-on fitting to exert an inwardly directed pressure on the O-ring and the pipe.

7. A locking assembly as set forth in claim 6 wherein the male fitting is screwed into the cage forcing the push-on fitting to remain in strict axial alignment with the pipe.

8. A locking assembly for securing the connection between a push-on fitting having an outwardly flared end fitted into a cage and surrounded by a garter-type coil spring housed within the cage of a pipe with a plurality of resilient O-rings sealing the connection between the push-on fitting and the pipe comprising an axially split externally threaded male fitting, the two mirror-image halves of said split male fitting being sized to snugly encircle the push-on fitting with one end of each of the two halves lying within the cage and resting against the flared end of the push-on fitting and forcing the coil spring away from the push-on fitting, and an axially split and internally threaded locking nut, the two mirror-image halves of said nut sized to snugly encircle the cage housing the coil spring while the internal threads of the two halves of the nut engage and mesh with the external threads of the two halves of the male fitting, the two halves of the locking nut being securely joined together by a pair of screws threaded into aligned holes in both halves of the locking nut, said aligned holes running transverse to the axis of the locking nut, whereby inwardly directed pressure is applied to the outside surface of the push-on fitting to exert an inwardly directed pressure on the O-rings and the pipe.

9. A locking assembly as set forth in claim 6 wherein the male fitting is screwed into the cage forcing the push-on fitting to remain in strict axial alignment with the pipe.

* * * * *